United States Patent [19]

Saito

[11] Patent Number: 4,767,018

[45] Date of Patent: Aug. 30, 1988

[54] AIR BREATHER DEVICE FOR A TANK

[75] Inventor: Takeshi Saito, Kariya, Japan

[73] Assignee: Kabushiki Kaisha Toyoda Jidoshokki Seisakusho, Kariya, Japan

[21] Appl. No.: 894,696

[22] Filed: Aug. 8, 1986

[30] Foreign Application Priority Data

Aug. 20, 1985 [JP] Japan .................... 60-127038

[51] Int. Cl.⁴ .................................... B65D 25/00
[52] U.S. Cl. ...................... 220/85 S; 220/85 VS; 220/85 VR
[58] Field of Search .......... 220/85 S, 85 VR, 85 VS, 220/367, 368, 373, 374, DIG. 27

[56] References Cited

U.S. PATENT DOCUMENTS

| | | | |
|---|---|---|---|
| 3,666,139 | 5/1972 | Urban | 220/85 S |
| 3,752,135 | 8/1973 | Peterson et al. | 220/85 VR X |
| 3,779,224 | 12/1973 | Tagawa et al. | 220/85 VS X |
| 3,845,841 | 11/1974 | Kloefkorn | 220/367 |
| 3,966,078 | 6/1976 | Johnson et al. | 220/374 X |
| 4,142,647 | 3/1979 | Walters | 220/85 S |
| 4,261,477 | 4/1981 | Casimir et al. | 220/85 VS X |
| 4,444,333 | 4/1984 | Anhegger | 220/85 S |
| 4,492,244 | 1/1985 | Chinn et al. | 220/85 S X |

FOREIGN PATENT DOCUMENTS 61-1393668  4/1986  Japan .

Primary Examiner—Steven M. Pollard
Attorney, Agent, or Firm—Brooks Haidt Haffner & Delahunty

[57] ABSTRACT

An air breather device for a tank includes a fuel tank for a road vehicle disposed in the frame of the vehicle and an air breather pipe disposed along the lateral side of the fuel tank perpendicular to the fore and aft direction of the frame. A first opening at one extremity of the air breather is disposed in an air space in the fuel tank while a second opening at the other extremity of the air breather is opened to the atmosphere. The air breather passes through the wall of the fuel tank and the first opening is situated in the neighborhood of the inner wall of the fuel tank opposite from the second opening. In this way even if the vehicle turns over on its right or left side, part of the air breathing pipe will remain disposed above the fuel or oil level such that the fuel or oil will be prevented from leaking from the tank.

2 Claims, 7 Drawing Sheets

4,767,018

AIR BREATHER DEVICE FOR A TANK

BACKGROUND OF THE INVENTION

This invention relates to fuel tanks and oil tanks on industrial vehicles such as forklift trucks. More particularly, it relates to an air breather provided for fuel tanks and oil tanks.

In general, fuel and oil tanks are provided with air breathers in order that the fuel or oil to be stored in the tanks can be smoothly introduced into and discharged out of the tanks. Heretofore, as the construction for such an air breather, an air-breathing through-hole was formed in an oil filler cap applied to an oil filler opening. As far as the Applicant is aware, there is no literature or publication disclosing the aforementioned construction of an air breather device for tanks, but a construction for air breather devices used in industrial vehicles so far produced by the Applicant for company use is shown in FIG. 1.

This figure is a sectional view showing a prior-art example wherein a retainer 9 is projectedly mounted to the top of a main body 8 of the tank and a cap 9a is removably mounted to the foremost opening portion of the retainer. A rubber seal 9c is fitted to the inside of the cap 9a. The rubber seal 9c and the cap 9a are respectively provided with air breather through-holes 9d and 9b in communication with each other.

In the case of the air-breather device in which the air-breather through-holes are formed in the oil filler cap as described hereinabove, the fuel or oil in the tank 8 can leak into the engine compartment by way of the air-breather through-hole 9d if the vehicle should turn over. In particular, the lift truck may catch on fire should the fuel leak into the engine compartment which is an especially dangerous possibility.

SUMMARY OF THE INVENTION

It is an object of the present invention to provide a highly effective means for obviating the above described disadvantages. For achieving the object, the present invention provides an air breather system for a tank comprising a fuel tank disposed in a frame, an air breather pipe disposed along the lateral side of the fuel tank perpendicular to the fore and aft direction of the chassis, a first opening at one extremity of said air breather, said first opening being disposed in an air space in said fuel tank, and a second opening at the other extremity of said air breather pipe, said second opening being open to the atmosphere, said air breather pipe passing through the wall of said fuel tank and said first opening being situated in the neighborhood of the opposite inner wall of the fuel tank from said second opening.

DESCRIPTION OF THE PREFERRED EMBODIMENT

Figure 1:
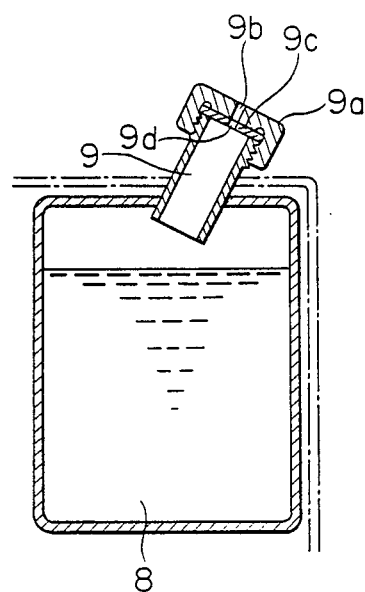
FIG. 1 is a sectional view of a conventional fuel tank.
Figure 2:
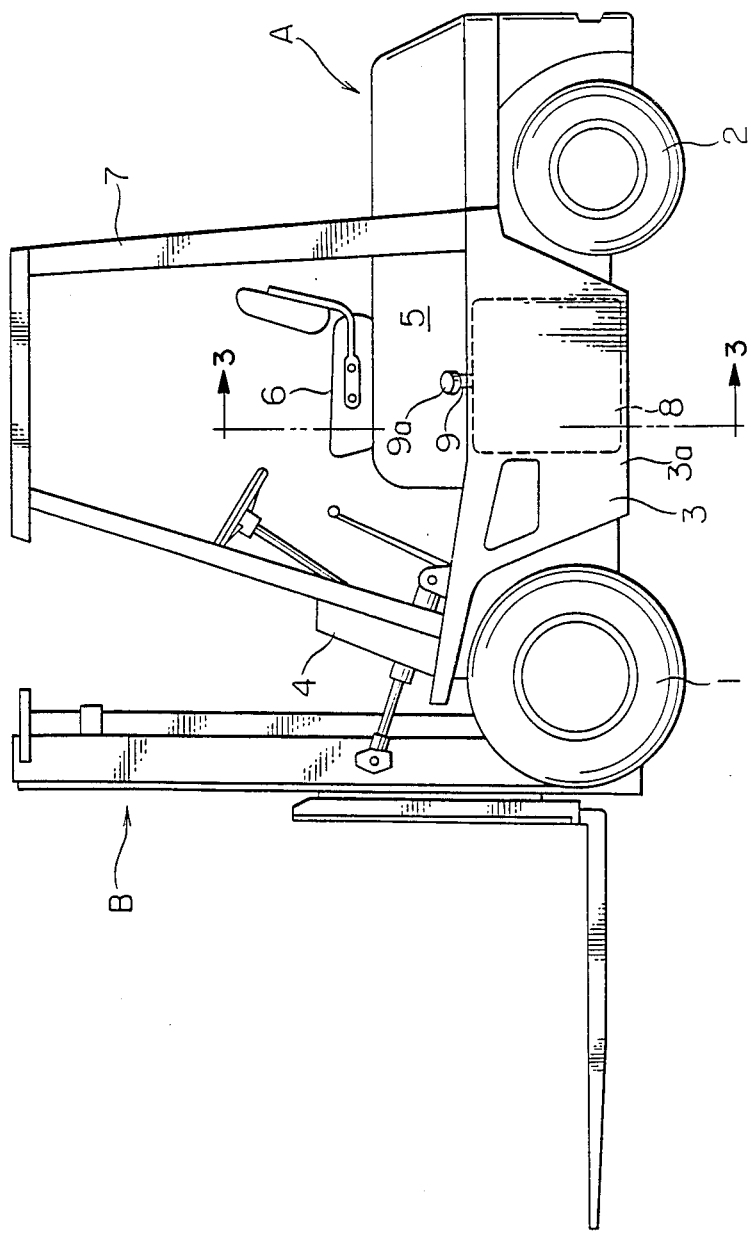
FIG. 2 is a side view showing a forklift truck equipped with an air breather device of the present invention.
Figure 3:
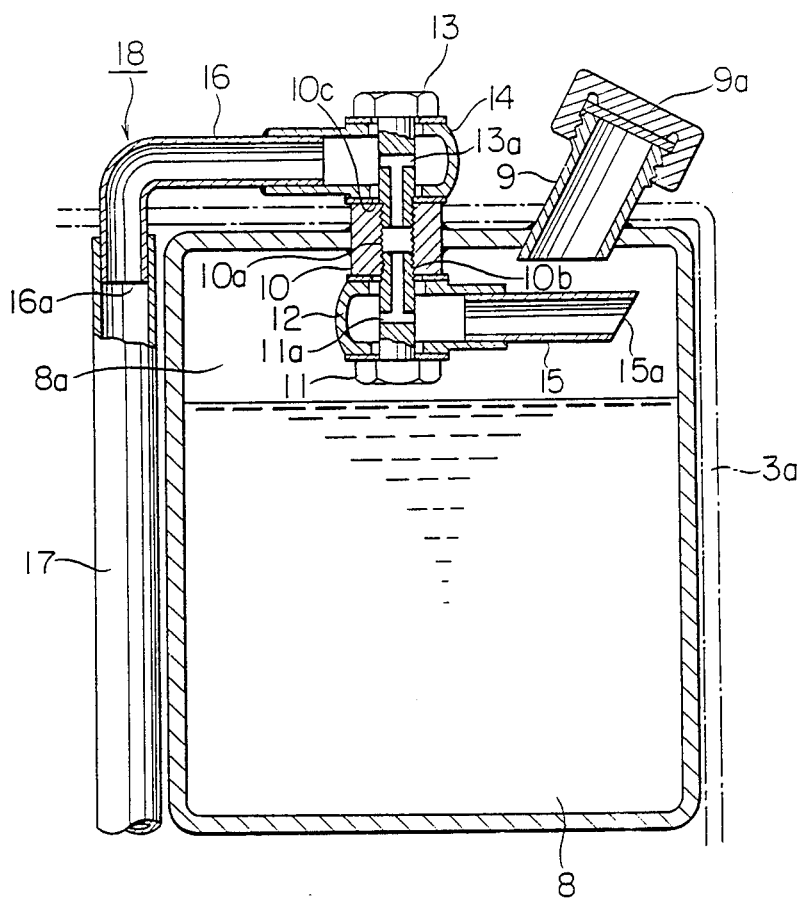
FIG. 3 is an enlarged sectional view of a fuel tank incorporating the present invention, the view being taken from lines 3—3 in FIG. 2.

Reference is now made to the accompanying drawings showing certain preferred embodiments of the present invention.

Referring first to FIGS. 2 through 5, A designates the main body of a truck and B is a lift unit mounted to the foremost part of the main body A. In the main body A, numeral 1 designates front wheels, 2 designates rear wheels, 3 is a chassis supported on the wheels 1 and 2, numeral 4 is a front protector, numeral 5 is an engine hood, numeral 6 is a driver's seat and 7 is a head guard. Within the frame 3 and in a space surrounded by left and right side frames 3a, 3a and the engine hood 5, there is provided an engine room, not shown. Within the engine room, besides an engine, a transmission casing and a crank case, there is also provided a fuel tank 8 which is offset towards one of the side frames 3a. An oil tank, also termed a fuel tank 8 in the present invention, is provided towards the other side frame 3a. In the present embodiment, the fuel tank is provided towards the left side of the vehicle chassis. On the top of the fuel tank 8 is provided an oil filler tube 9 to project out of the fuel tank 8 at an inclination towards one lateral side, in the present embodiment, towards the left hand side in the forward direction, of the vehicle. At approximately the center of the top of the fuel tank 8, a vertically extending boss 10 is provided vertically. The boss 10 is in the form of a hollow cylinder with its one end communicating with the interior of the fuel tank 8. On the surface of the hollow interior of the boss 10 is formed a female threaded portion 10a. To a lower opening 10b of the boss 10, there is connected a union eye 12 having its union bolt 11 threadably connected to the female threaded portion 10a formed in the opening 10b. Similarly, to an upper opening 10c, there is connected another union eye 14 having its union bolt 13 threadably connected to the female threaded portion 10a formed in the opening 10c. The union bolts 11, 13 are respectively provided with through-holes 11a, 13a, through which the union eyes 12, 14 are in communication with each other. To the union eye 12 is connected a first pipe 15 having a first opening 15a. The pipe 15 extends horizontally into an air space 8a in the upper part of the fuel tank 8 and towards one lateral side of the base block 3, in the present embodiment, towards the left side in the forward direction or towards the side opposite from a hose 17 to be described later. Similarly, to the union eye 14, there is connected a second pipe 16 having a second opening 16a and horizontally extending towards the other side of the base block, in the present embodiment, towards the right in the forward direction. Stated differently, the pipes 15 and 16 are provided to extend horizontally towards both sides of the frame with a 180° angle of offset from each other and at right angles with the fore and aft direction of the frame 3. To a second opening 16a which is at the distal end of the second pipe 16 the hose 17 of a suitable length is connected, with the free end of the hose 17 being situated outside of the engine room within the frame 3. In this manner, an air breather pipe 18 is constituted by the aforementioned first and second pipes 15 and 16.

The numeral 9a designates a cap applied to the fuel supply tube 9. No air breather holes are formed in the cap 9a so that the tank is hermetically sealed when the cap is screwed onto the tube.

The device so far shown and described operates as follows.

(i) During normal operation

During normal operation of the forklift truck, the air space 8a formed in the upper end of the fuel tank 8 is communicated with air outside the engine room by way of the air breather pipe 18.

(ii) When turned over

Figure 4:
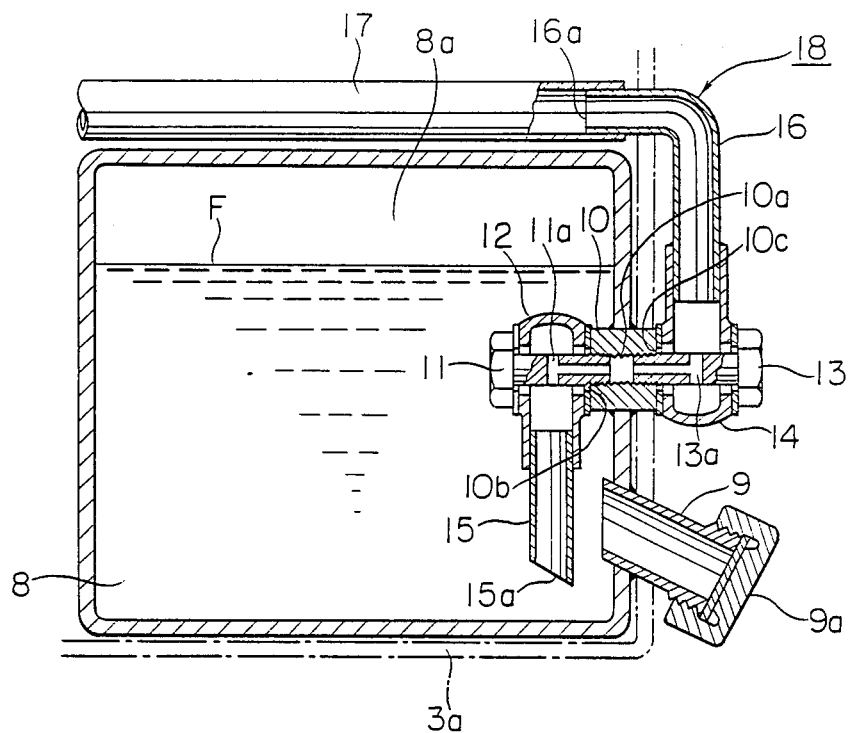
FIGS. 4 and 5 are similarly enlarged sectional views showing the operating states of the fuel tank of FIG. 3.
Figure 5:
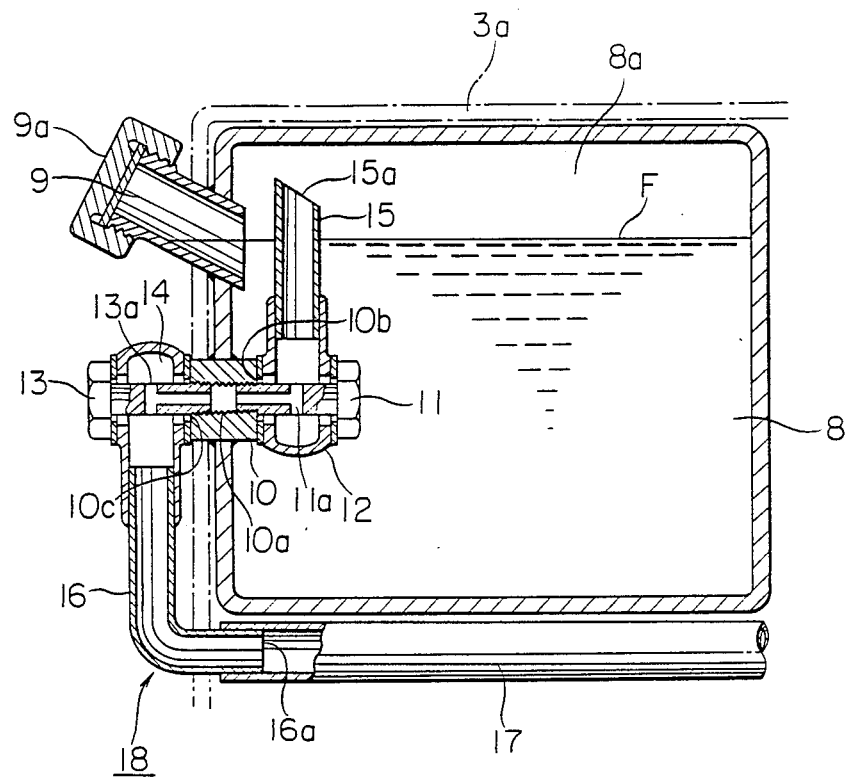

If the forklift truck turns over on its left side with respect to the forward direction, the first pipe 15 becomes immersed in the fuel, as indicated in FIG. 4. However, since the pipe 16 projects above the fuel level F, fuel is prevented from leaking from the air breather 18. If the forklift truck turns on its right side with respect to the forward direction, the first pipe 15 projects above the fuel level F as indicated in FIG. 5, so that fuel leakage from the air breather pipe 18. is also prevented. However, not only when the first pipe 15 is immersed in the fuel as shown in FIG. 4, but also when the first pipe 15 projects above the fuel level F, as shown in FIG. 5, a certain amount of the fuel finds its way into the air breather pipe 18 because of the shock of turning over. However, the fuel thus introduced into the air breather pipe 18 will be discharged out of the engine room by way of the hose 17 without leaking into the engine room.

Figure 6:
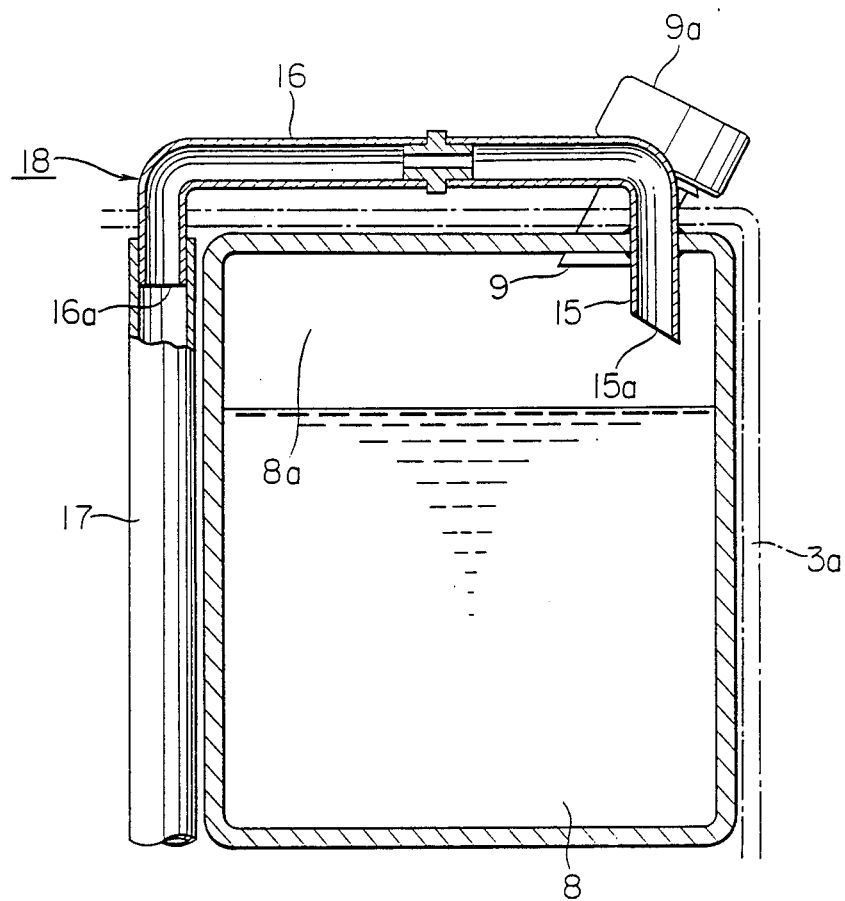
FIGS. 6 and 7 are similarly enlarged sectional views showing modified embodiments of the fuel tank of the present invention.
Figure 7:
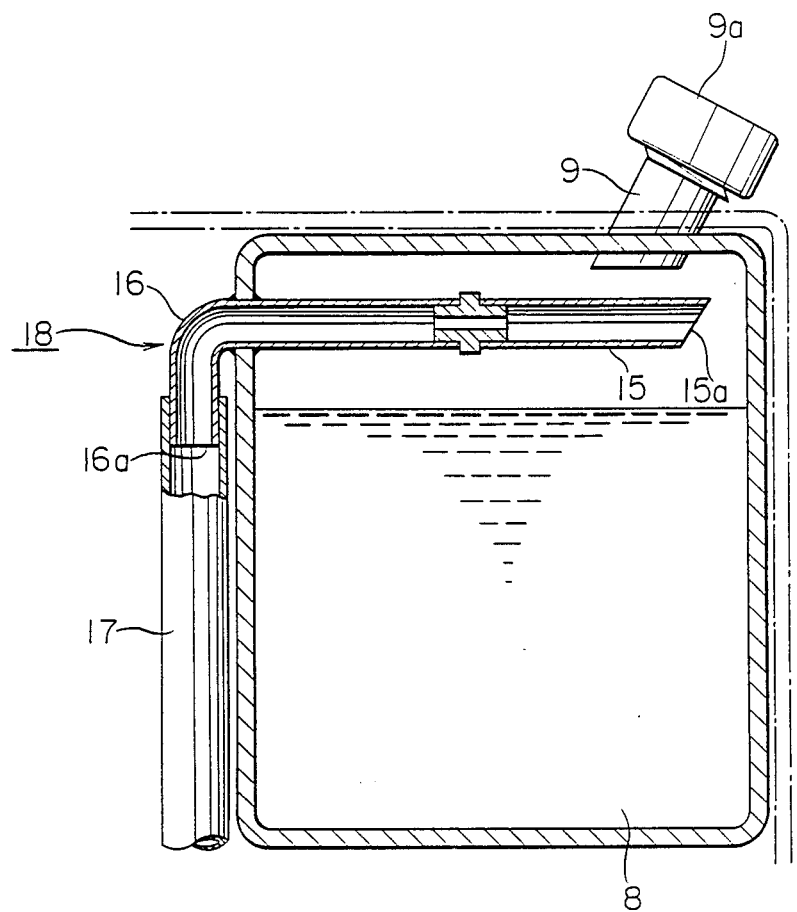

In the above embodiment, the second pipe 16 on one side of the boss 10 is mounted outside the fuel tank 8 while the first pipe 15 on the other side of the boss 10 is mounted within the fuel tank 8. However, the piping structure of the air breather pipe is not limited to that shown and described in the above embodiment. For example, as shown in FIG. 6, the air breather pipe may be disposed outside the fuel tank 8 or on the opposite side of the fuel tank from the air breather pipe mounted along the tank such that only the open end of the air breather pipe will be facing the peripheral edge of the air space 8a. Alternatively, as shown the air in FIG. 7, the air breather pipe may be drawn from the side wall of the fuel tank 8 into the air space such that the open end of the air breather pipe will be facing the peripheral edge of the air space 8a. Namely, (a) the piping structure in which the air breathing piping 18 is extended towards the upper edge of the tank 8 along the left and right sides of the frame; (b) the piping structure in which the first opening 15a of the air breather pip 18 is positioned facing the peripheral edge of the inner wall of the air space 8a; or (c) the piping structure in which the other or second opening 16a of the air breather pipe 18 is disposed outside the engine room 8a, are all included within the scope of the present invention.

In the above described construction of the present invention, when the air breather pipe extends along the upper surface of the tank, it is set so as to extend vertically along the lateral sides of the tank parallel to the fore and aft direction of the main body of the vehicle with one extremity thereof opening into the atmosphere and the other extremity thereof opening into the air space in the upper end of the tank, said other extremity being disposed at the side opposite from the vertically extending portion of the air breather pipe in such a fashion that, no matter whether the vehicle turns over on its right or left side, the air breather pipe still partially projects above the fuel or oil levels, thereby effectively preventing the fuel or oil from leaking.

When the other opening or extremity of the air breather pipe is disposed outside the engine room as described above, that portion of the fuel or oil running into the air breather pipe can be discharged outside the engine room, thereby preventing an engine fire if the forklift turns over further improving operating safety of the lift truck.

What is claimed is:

1. An air breather system for an oil or fuel tank mounted in an engine space of a road vehicle, said breather system comprising an air breather pipe disposed substantially perpendicular and transversely to the fore and aft direction of a frame of the vehicle, said air breather pipe having a first horizontal pipe section extending transversely within, and towards only one lateral sidewall of said tank and opening at only one end thereof within the interior air space at a location adjacent to both a top wall and said one lateral sidewall of said oil or fuel tank, a second horizontal pipe section exterior of said tank extending transversely towards and beyond the opposite lateral sidewall of said tank and having an end thereof at a location adjacent to said opposite lateral sidewall of said tank, a substantially vertically extending pipe section passing through a top wall of said fuel tank and connecting said first and second sections in flow communication with each other, and means providing a flow constricting opening within said vertically extending pipe section, whereby said normal air space is vented to the atmosphere through said air breather pipe when said tank is in substantially vertical position and when said tank is overturned towards its said opposite lateral sidewall, and said first pipe section opening is submerged in oil or fuel when said tank is overturned towards its said one lateral sidewall, and hose connected to said end of said second horizontal pipe section and extending to an open end thereof outside of said engine space.

2. An air breather system according to claim 1 characterized in that a solid cap devoid of a through-hole is removably mounted to an oil filler of the fuel tank.

* * * * *